(12) United States Patent
Wu et al.

(10) Patent No.: US 7,416,417 B2
(45) Date of Patent: Aug. 26, 2008

(54) CONNECTOR ALIGNMENT SYSTEM FOR A HIGHLY INTEGRATED, INSTALLABLE MINIATURIZED FORM FACTOR CARD FOR WIRELESS COMMUNICATIONS FUNCTIONS

(75) Inventors: Hongqi Wu, Chengdu (CN); Shanquan Bao, Alameda, CA (US); William X. Huang, San Ramon, CA (US); John H. Seibert, Collegeville, PA (US); Edward J. Pupkiewicz, Lansdale, PA (US); Joseph A. Kiszka, Freehold, NJ (US)

(73) Assignees: Utstarcom, Inc., Alameda, CA (US); Tyco Electronics Corporation, Middletown, PA (US)

( * ) Notice: Subject to any disclaimer, the term of this patent is extended or adjusted under 35 U.S.C. 154(b) by 5 days.

(21) Appl. No.: 11/551,645

(22) Filed: Oct. 20, 2006

(65) Prior Publication Data

US 2007/0238325 A1    Oct. 11, 2007

Related U.S. Application Data

(63) Continuation-in-part of application No. 11/308,559, filed on Apr. 6, 2006.

(51) Int. Cl.
*H01R 12/00* (2006.01)
(52) U.S. Cl. ...................................................... 439/66

(58) Field of Classification Search ................. 439/630, 439/541.5, 326, 136, 131, 135, 137–140, 439/155, 152, 328, 76.1, 298, 680, 331, 159; 361/684, 737
See application file for complete search history.

(56) References Cited

U.S. PATENT DOCUMENTS

| | | | |
|---|---|---|---|
| 5,822,183 A * | 10/1998 | Kanda et al. ................. | 361/684 |
| 6,835,071 B2 | 12/2004 | Pupkiewicz et al. | |
| 6,855,013 B2 | 2/2005 | Chiang et al. | |
| 6,896,548 B2 * | 5/2005 | Scuteri et al. ............ | 439/541.5 |
| 7,238,038 B2 * | 7/2007 | Kumagai ..................... | 439/326 |

* cited by examiner

*Primary Examiner*—Edwin A León
(74) *Attorney, Agent, or Firm*—Felix L. Fischer (57) ABSTRACT

A connector system for a miniaturized form factor card allows a communications system for mobile information devices having an applications processor and user interface components. A receiving frame is provided in the mobile information device for an insertable miniaturized form factor card incorporating means for RF transmission and reception and a wireless modem. A connector moiety on the card is received in a mating moiety in the receiving frame. The applications processor and the user interface components in the mobile information device are interconnected to digital functions of the wireless modem and means for RF transmission and reception through the connector.

17 Claims, 7 Drawing Sheets

CONNECTOR ALIGNMENT SYSTEM FOR A HIGHLY INTEGRATED, INSTALLABLE MINIATURIZED FORM FACTOR CARD FOR WIRELESS COMMUNICATIONS FUNCTIONS

REFERENCE TO RELATED APPLICATIONS

This application is a continuation-in-part of U.S. application Ser. No. 11/308,559 filed on Apr. 6, 2006 entitled CONNECTOR FOR A HIGHLY INTEGRATED, INSTALLABLE MINIATURIZED FORM FACTOR CARD FOR WIRELESS COMMUNICATIONS FUNCTIONS.

BACKGROUND OF THE INVENTION

1. Field of the Invention

This invention relates generally to the field of operating platforms for mobile phones and personal data systems and more particularly to a connector system with integral alignment elements to be employed with generic mobile information devices for a wireless communications card with a miniaturized form factor which is insertable into the mobile information devices to accommodate desired wireless communication functions.

2. Related Art

Current design time-to-market for mobile phone and personal information devices is extended due to current design philosophy and practice. Turn-around time for a typical complete handset design is about 9 months. Currently terminal vendors need to spend significant amount of resources on basic wireless communication functions and cannot concentrate on truly value-added design works, such as industrial design and software applications. It is also difficult to develop multiple models with significant differences based on a common printed circuit board (PCB) platform. Traditional wireless devices using discrete solution have difficulty supporting multiple band or modes such as GSM, CDMA, 3G. Discrete chipset solutions consume at least three times more PCB space. There are significant financial and technical barriers of entry for new companies without significant resources, or established companies without wireless expertise.

Currently there are some vendors selling modules that can provide wireless communication functions in a particular wireless technology. However these modules are large in size with proprietary interfaces. These modules require significant amount of vendor integration. Alternatively, certain prior art systems are simply modularizing wireless modem functions. Prior art systems for removable cartridges providing communications elements such as that disclosed in U.S. Pat. No. 6,690,947 to Tom provide some flexibility in applications design; however, such systems were bulky and lacked packaging and connector innovations required for practical application of such systems.

U.S. patent application Ser. No. 11/308,221 filed on Mar. 13, 2006 entitled MINIATURIZED FORM FACTOR WIRELESS COMMUNICATIONS CARD FOR GENERIC MOBILE INFORMATION DEVICES, which is incorporated herein by reference in its entirety as though fully set forth, provides a system that can save RF tuning, debugging and certification thereby reducing design lead time significantly. This system provides the ability to integrate hardware, software, utilities and drivers which will allow true plug and play functionality for end users or mobile information device design houses. The desired functional capability is provided through an insertable card to eliminate the requirement for a separate CPU or applications processor in the mobile information device and additionally, provides a complete modem solution that will support multi-mode and multi-band.

To enhance the space savings and weight reduction to permit more compact portable devices and flexible designs and integrate chipset and passive components into a common module, the system provided in copending patent application Ser. No. 11/308,559 filed on Apr. 6, 2006 entitled CONNECTOR FOR A HIGHLY INTEGRATED, INSTALLABLE MINIATURIZED FORM FACTOR CARD FOR WIRELESS COMMUNICATIONS FUNCTIONS, which is incorporated herein by reference as though fully set forth, employs integral connector systems having standard interfaces and indexing for mating to PC boards within the mobile information device platforms and to properly index and mate the miniaturized form factor card. To further enhance the connector in such a common module it is desirable that the connector system incorporate integral alignment systems for accurate placement of the miniature form factor card within the connector system and the connector system on the printed circuit board in the generic mobile information devices.

SUMMARY OF THE INVENTION

The present invention provides a connector arrangement for a wireless communications card for mobile information devices with user interface components. A receiving frame is mounted on a printed circuit board in the mobile information device to receive an insertable miniaturized form factor card incorporating means for RF transmission and reception and a wireless modem. The receiving frame incorporates a first set alignment elements arranged in substantially diagonal relationship on a bottom surface of the frame. An indexing connector moiety is present on the card which is received in a mating moiety in the receiving frame and the card incorporates a set of alignment elements for engagement with a set of mating alignment elements on a top surface of the frame. The frame also incorporates a receiving element for an elastomeric connector providing the mating connector moiety. A set of indexing elements on the receiving element enhances alignment of the elastomeric connector. The PC board in the mobile information device includes mating alignment elements for the first alignment elements on the frame to precisely position the frame with respect to mating connector elements on the PC board for the elastomeric connector. The applications processor, the user interface components, or both in the mobile information device are interconnected to digital functions of the wireless modem and means for RF transmission and reception through the precise alignment connector.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

FIG. 1 demonstrates one embodiment of a miniaturized form factor card 10 employed with a connector system according to the invention. In an exemplary embodiment, the form factor of the card is comparable to a secure digital (SD) card having a substantially rectangular dimensional planform of about 24 by 32 mm with a thickness of about 2-3 mm. The card includes the necessary communications elements for a wireless communications system such as Personal Handy-Phone System (PHS), Code Division Multiple Access (CDMA), Global System for Mobile communications (GSM), WiMax, wireless LAN, Digital Video Broadcast—Handheld (DVB-H) or Universal Mobile Telecommunications System (UMTS), including single or multiband.

Card 10 incorporates a first connector moiety 12 which incorporates a plurality of conductive pads 14. The pads of the first moiety for the embodiment shown include elongated pads 16 for the RF signal connector elements. The card also incorporates alignment holes 18a, 18b and 18c for engagement of mating alignment elements to be described in greater detail subsequently.

Figure 1A:
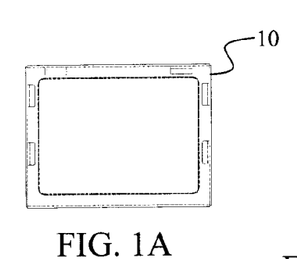
FIGS. 1A-1E are top, side, bottom, isometric top and isometric bottom views of a miniaturized form factor card employed in a connector system according to the present invention and an exemplary mobile information device.
Figure 1B:
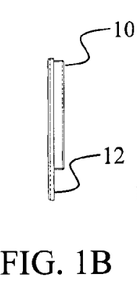
Figure 1C:
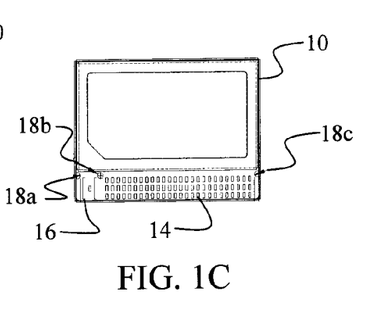
Figure 1D:
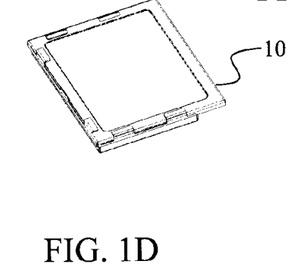
Figure 1E:
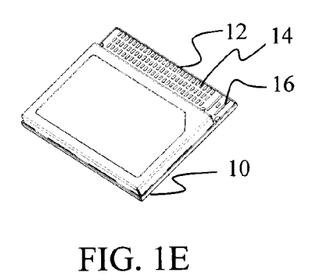
Figure 2:
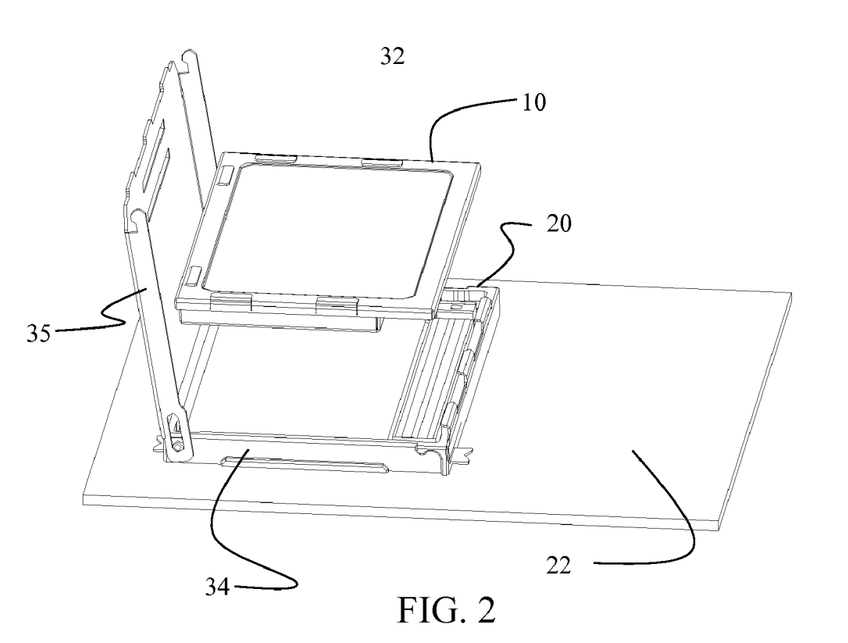
FIG. 2 is an isometric top view of a miniaturized form factor card and the receiving frame with closure element as mounted on a PC board of a Mobile Information Device employing a connector system according to the present invention.

A view of the card positioned for installation and the mounting frame 20 on the printed circuit board 22 of the mobile information device in which the card is to be installed is provided in FIG. 2. The connector system according to the present invention provides indexing arrangements for simplified installation such that mobile interface device designers can provide a common platform for multiple systems without custom design of the communication electronics. The installation is accomplished by the end user in certain operational scenarios. Card 10 is received within the frame mounted to PC board in the MID handset. A second connector moiety, which for the embodiment shown is a first elastomeric connector 24 for digital signals and a second elastomeric connector 26 for RF signals, is contained within connector receiving slots 28 and 30 respectively in the frame to receive the mating elements of the first connector moiety. An exemplary elastomeric connector is a STAX™ connector produced by Tyco Electronics. For the digital signals connector, a STAX™ model LD connector is employed in exemplary embodiments.

Figure 3:
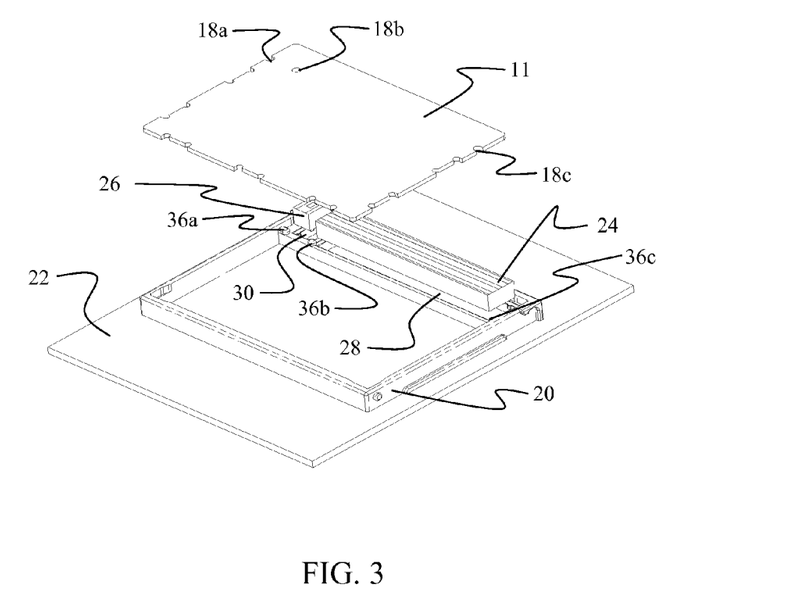
FIG. 3 is an exploded partial isometric of the receiving frame, elastomeric connectors and card bottom.

The card is installed in the mobile device, for the embodiment of the connector system shown in FIG. 2, by insertion vertically within frame 20 which receives the external edges 32 of the card. The connector arrangement and location provides an initial indexing for connection orientation of the card in the frame. Opposing side edges 34 of the frame provide rough alignment of the card within the frame for engagement of the connector moieties. A hinged cover 35 is provided on the frame to secure the entire card within the frame after insertion, urging the connector moieties into firm engagement. As seen in FIG. 3, the frame includes mating alignment elements 36a, 36b and 36c on an upper surface for the alignment elements on the card provided as holes 18a, 18b and 18c previously described which are provided in a bottom plate 11 of the card. These mating alignment elements provide precision alignment of the card in the frame to accurately position the conductive pads in the first connector moiety on the card with the pads in the elastomeric digital and RF connectors.

Figure 4:
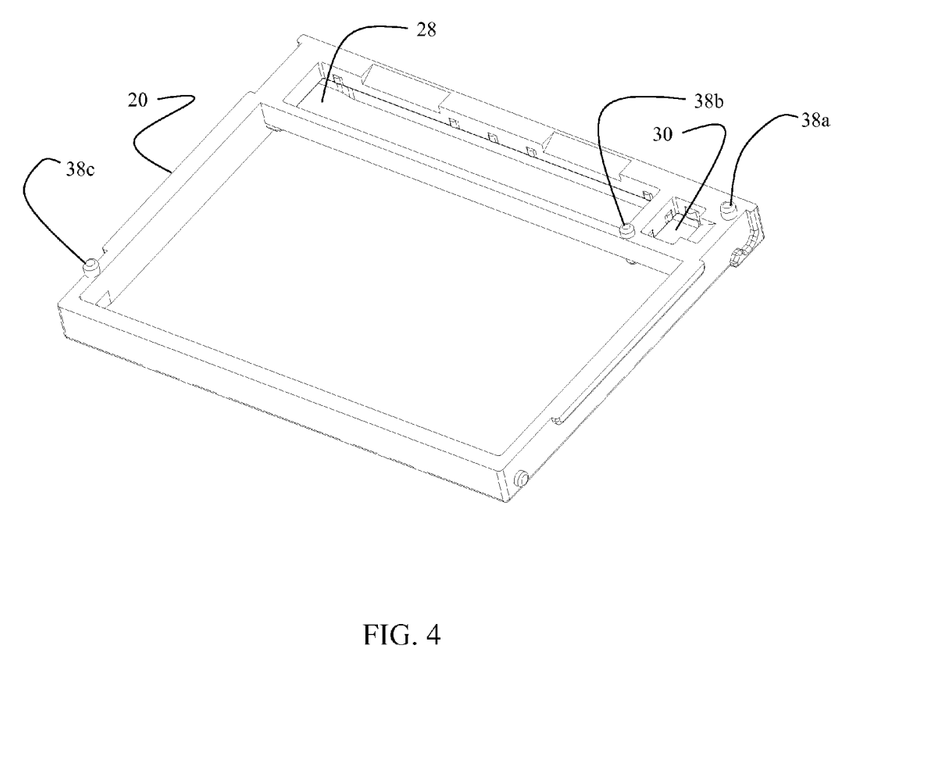
FIG. 4 is a bottom isometric view of the frame.
Figure 5:
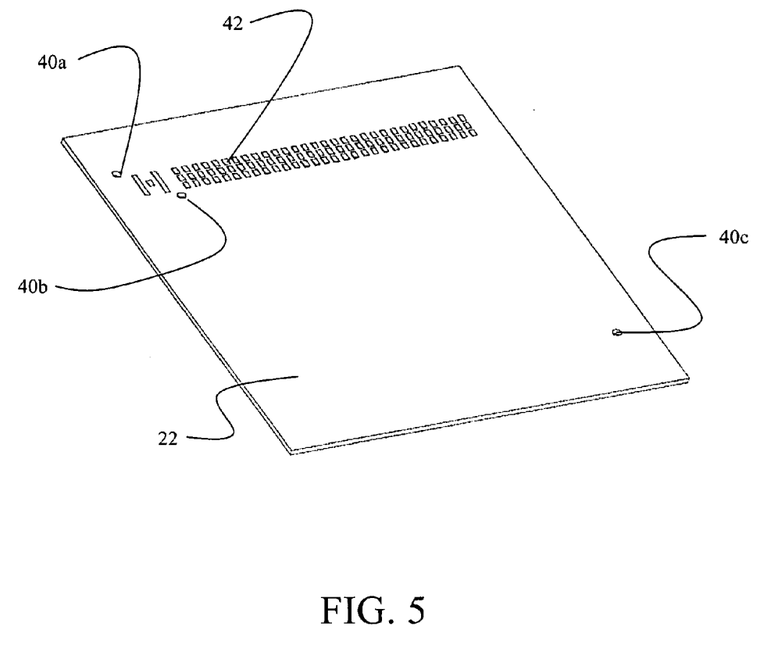
FIG. 5 is a top isometric view of the PC board.

Similarly as shown in FIG. 4, the frame incorporates a second set of alignment elements 38a, 38b and 38c on a lower surface of the frame which engages the PC board. These alignment elements are arranged in a substantially diagonal geometry across the frame to engage mating alignment elements provided by holes 40a, 40b and 40c in the PC board as shown in FIG. 5. The diagonal arrangement provides the greatest geometric alignment arm for precise alignment of the frame with the board while minimizing the number of alignment elements required. Precision drilling of the holes in the board enhances maintaining the frame squared condition to counter any flexing of the frame. Laser drilling the holes or precision forming as known to those skilled in the art is employed. Precise alignment of the frame on the board creates precise alignment of the connector pads 42 on the board with the elastomeric connector elements carried by the frame. Fabrication of the frame from metal such as aluminum or steel or fiber loaded composite matrix material with about 50% fiber loading creates a reasonably rigid frame. However, the diagonal arrangement of the alignment elements further enhances the rigidity of the frame while assuring that any "unsquare" condition in the frame is corrected by insertion of the alignment pins on the frame into the mating alignment holes on the board. For the embodiments depicted, composite matrix frames are fabricated using PPO as the matrix with carbon or glass fibers.

Figure 6:
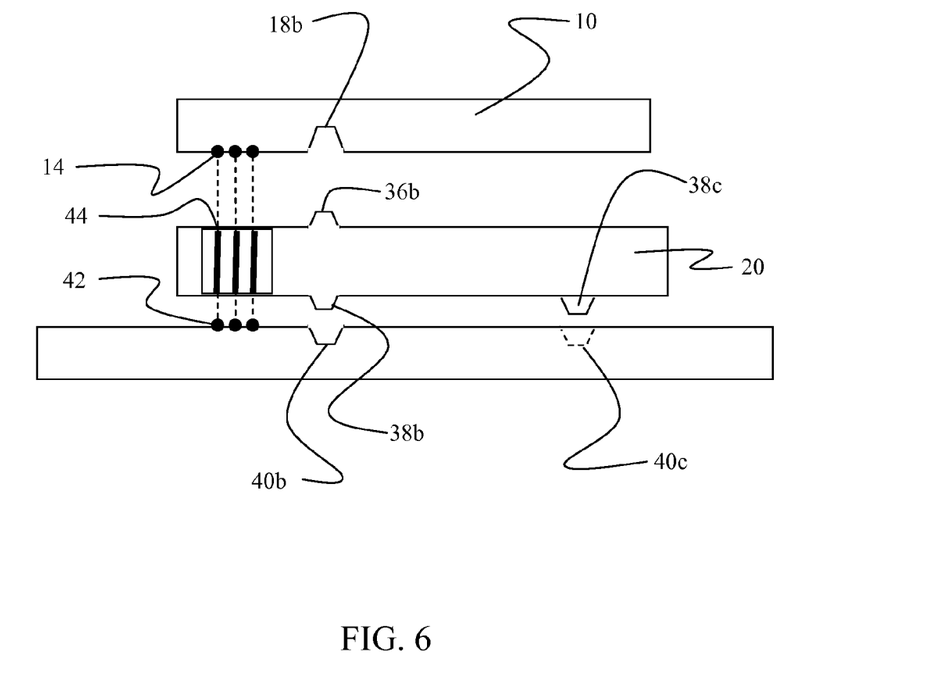
FIG. 6 is an exploded side section view of the card, frame, elastomeric connectors and PC board of FIG. 2 showing exemplary alignment elements.

As shown in FIG. 6, the alignment elements of the card, frame and PC Board provide the precision alignment for the electrically contacting elements of the connector system. Alignment elements 18a, 18b and 18c on the card and the mating alignment elements 36a, 36b and 36c on the frame align pads 14 and 16 in the connector moiety on the card with the conductive elements 44 in the elastomeric connectors secured within the frame. The frame alignment elements 38a (not shown in the section view of FIG. 6), 38b and 38c then provide alignment of conductive elements 44 in the elastomeric connectors with connector pads 42 on the board through engagement of the mating alignment elements 40a (not shown in the section view of FIG. 6), 40b and 40c in the board. Linear placement of sets of alignment elements, for example elements 36b, 38b arranged in linear opposition as shown in FIG. 6, assure that overall alignment from element 18b on the card to element 40b on the PC board is maintained during thermal expansion or contraction.

Figure 7:
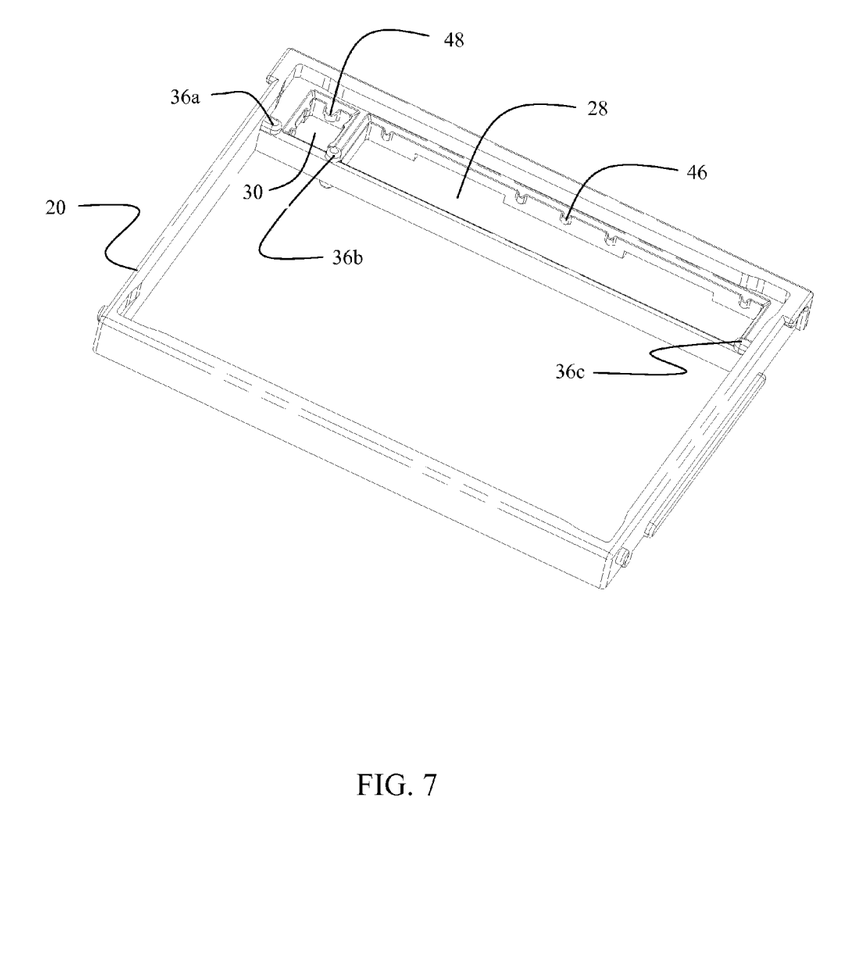
FIG. 7 is a top isometric view of the frame.

FIG. 7 shows a top view of an exemplary embodiment of the frame with details of the alignment elements for the card shown as pins 36a, 36b and 36c. Additionally, alignment protrusions 46 in slot 28 which receives the digital signals elastomeric connector engage the connector for alignment within the slot to further assure placement of the conductors in optimum position for contact with the card and board connector pads. Similarly, alignment protrusion 48 in slot 30 for the RF elastomeric connector orients and aligns the connector for accurate placement of the conductors. Slot 28 provides a tolerance for expansion of the Elastomeric connector when deformed under compression between the card and the PC board. As the Elastomeric connector is compressed vertically, its volume is displaced and expands horizontally within the slot. The protrusions maintain the elastomeric connector in alignment with the pads on the card and the PC board during this related vertical compression and horizontal expansion.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An alignment system for connectors for insertable miniaturized form factor cards comprising:
   a first connector moiety integrated onto miniaturized form factor card;
   a self standing frame element sized to receive the card and mounted to a printed circuit board (PCB) in a mobile information device (MID), the frame element having a plurality of alignment elements arranged in substantially diagonal relationship on the frame;
   means for securing the card upon insertion into the frame;
   a second connector moiety constrained within the frame for operable engagement of the first connector moiety upon insertion of the card into the frame, said second connector moiety engaging contact pads on the MID PCB; and
   mating alignment elements in the MID PCB arranged to receive the alignment elements on the frame for alignment of the second connector moiety with the contact pads.

2. An alignment system as defined in claim 1 wherein the means for securing comprises a cover connected to a first end of the frame and rotatable from a first open position for insertion of the card to a second closed position.

3. An alignment system as defined in claim 1 wherein the second connector moiety is an elastomeric connector.

4. An alignment system as defined in claim 1 further comprising securing means for the second connector moiety in the frame.

5. An alignment system as defined in claim 4 wherein the securing means comprises at least one slot in the frame.

6. An alignment system as defined in claim 5 further comprising alignment protrusions within the slot for engagement of the second connector moiety.

7. An alignment system for connectors for insertable miniaturized form factor cards comprising:
   a first connector moiety integrated onto miniaturized form factor card, the card having a first plurality of alignment elements spaced on a bottom plate for alignment of the first connector moiety;
   a frame element sized to receive the card and mounted to a printed circuit board (PCB) in a mobile information device (MID), the frame element having a first plurality of spaced mating alignment elements in an upper surface to engage the alignment elements on the card and a second plurality of alignment elements on a lower surface;
   means for securing the card upon insertion into the frame;
   a second connector moiety constrained within the frame for operable engagement of the first connector moiety upon insertion of the card into the frame, said second connector moiety engaging contact pads on the MID PCB; and
   mating alignment elements in the MID PCB arranged to receive the second plurality of alignment elements on the frame for alignment of the second connector moiety with the contact pads.

8. An alignment system as defined in claim 7 wherein the second plurality of alignment elements is arranged substantially diagonally across the frame.

9. An alignment system as defined in claim 7 wherein the second connector moiety is an elastomeric connector.

10. An alignment system as defined in claim 7 further comprising securing means for the second connector moiety in the frame.

11. An alignment system as defined in claim 7 wherein the frame is metallic.

12. An alignment system as defined in claim 7 wherein at least one of said first plurality of alignment elements and an associated at least one of said second plurality of alignment elements are arranged in linear opposition.

13. An alignment system as defined in claim 7 wherein the securing means comprises at least one slot in the frame.

14. An alignment system as defined in claim 13 further comprising alignment protrusions within the slot for engagement of the second connector moiety.

15. An alignment system as defined in claim 7 wherein the frame is fiber loaded composite matrix material.

16. An alignment system as defined in claim 15 wherein the fiber loaded composite matrix material is PPO with about 50% fiber loading.

17. An alignment system as defined in claim 16 wherein the fiber loading is selected from one of the group of carbon fibers and glass fibers.

* * * * *